(12) United States Patent
Allard

(10) Patent No.: US 8,469,077 B1
(45) Date of Patent: Jun. 25, 2013

(54) PORTABLY ENGAGED RETRACTABLE SUN SHADE

(76) Inventor: Thomas Allard, Lincoln, RI (US)

( * ) Notice: Subject to any disclaimer, the term of this patent is extended or adjusted under 35 U.S.C. 154(b) by 0 days.

(21) Appl. No.: 13/185,524

(22) Filed: Jul. 19, 2011

(51) Int. Cl.
*E06B 9/08* (2006.01)

(52) U.S. Cl.
USPC .............................................. 160/24; 160/71

(58) Field of Classification Search
USPC .................. 160/24, 370.22, 71, 80; 296/97.8, 296/97.9, 97.12; 135/88.11; 359/461
See application file for complete search history.

(56) References Cited

U.S. PATENT DOCUMENTS

| | | | |
|---|---|---|---|
| 2,346,274 A * | 4/1944 | Raven | 248/121 |
| 2,498,563 A * | 2/1950 | Mallory | 160/24 |
| 2,546,299 A * | 3/1951 | Du Mais et al. | 160/24 |
| 2,591,685 A * | 4/1952 | Du Mais et al. | 248/125.1 |
| 3,144,899 A * | 8/1964 | Stewart et al. | 160/24 |
| 3,205,772 A * | 9/1965 | Guske | 359/461 |
| 3,225,818 A * | 12/1965 | Wise | 160/24 |
| 3,289,737 A * | 12/1966 | Kozel | 160/24 |
| 3,313,337 A * | 4/1967 | Bernat | 160/24 |
| 3,581,436 A * | 6/1971 | Basiger | 47/22.1 |
| 3,629,910 A | 12/1971 | Kirberg | |
| 3,750,994 A * | 8/1973 | Bieschke | 248/324 |
| 3,906,969 A * | 9/1975 | Myers | 135/88.11 |
| 3,942,868 A * | 3/1976 | Hoffbauer et al. | 359/461 |
| 4,124,196 A * | 11/1978 | Hipskind | 256/1 |
| 4,619,305 A | 10/1986 | Comeau | |
| 5,172,745 A * | 12/1992 | Wang | 160/370.22 |
| 5,653,278 A * | 8/1997 | Cheng | 160/370.22 |
| 5,685,354 A | 11/1997 | Kim | |
| D393,560 S | 4/1998 | Adams | |
| 5,896,910 A * | 4/1999 | Chen | 160/370.22 |
| 6,079,683 A * | 6/2000 | Lin | 248/292.12 |
| 6,189,948 B1 | 2/2001 | Lin | |
| 6,330,898 B1 * | 12/2001 | Chang | 160/24 |
| 6,457,508 B1 | 10/2002 | Tomita | |
| 6,712,115 B2 | 3/2004 | Judkins | |
| 6,991,019 B2 * | 1/2006 | Chang | 160/24 |
| 2005/0087308 A1 * | 4/2005 | Vaughan | 160/24 |

* cited by examiner

*Primary Examiner* — David Purol

(57) ABSTRACT

The portably engaged retractable sun shade includes a clamping means that enables the device to attach to a hand rail of a patio or deck to provide a portable sun shade. A telescoping tube extends from the clamping means to provide a means of supporting a retractable shade. The retractable shade is spring loaded and returns to a retracted state unless held in an extended state via a pivoting hanger engaged atop said telescoping tube. The retractable shade can rotate vertically with respect to the telescoping tube for storage when no longer in use.

3 Claims, 6 Drawing Sheets

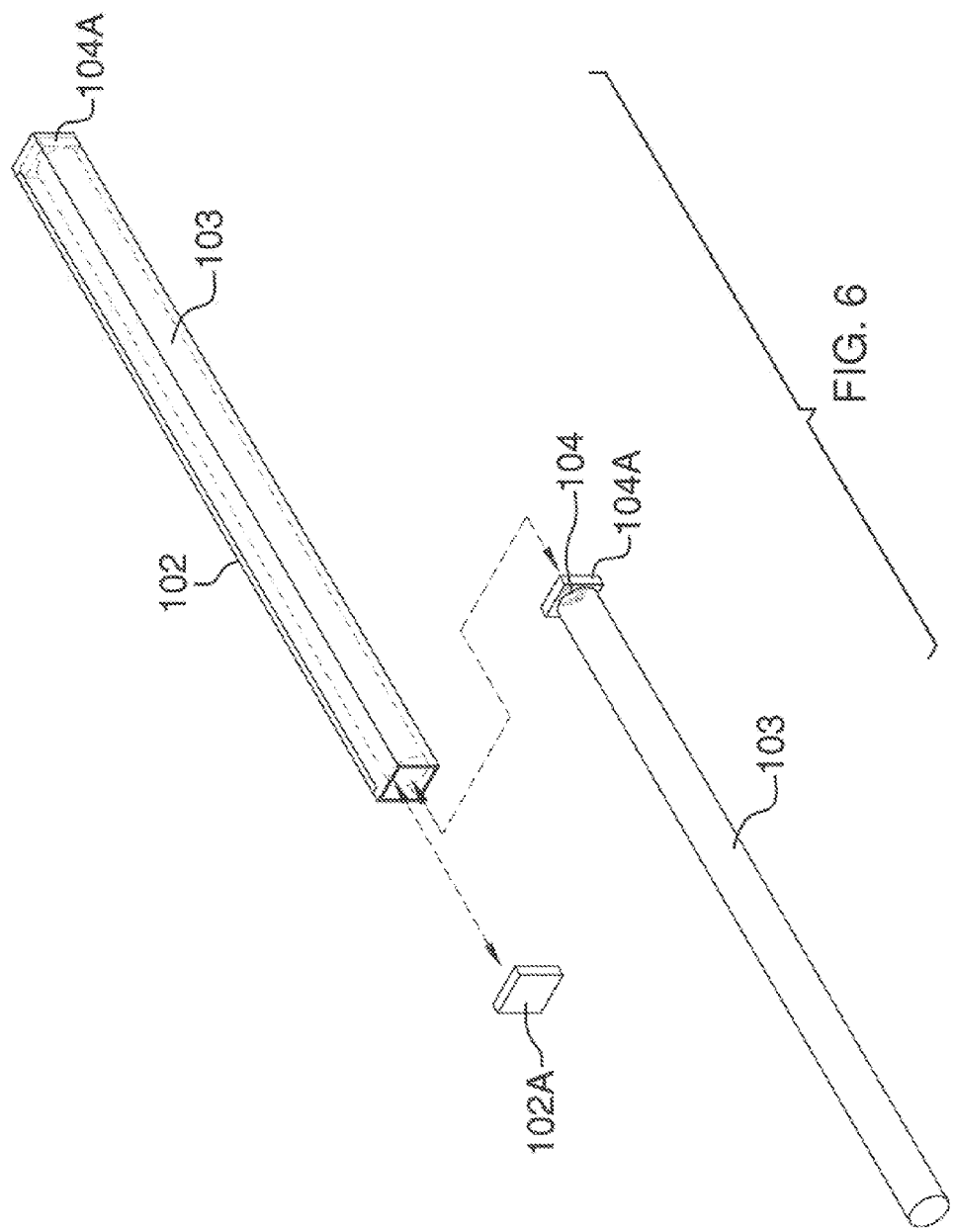

PORTABLY ENGAGED RETRACTABLE SUN SHADE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of projector screens, more specifically, a projector screen suitably adapted for use as a sun shade and of which is portable.

B. Discussion of the Prior Art

As will be discussed immediately below, no prior art discloses a portable sun shade that attaches to a hand rail of a patio or deck and of which a retractable sun shade extends upon a telescoping tube to provide shade to an area of the patio or deck immediately adjacent; wherein a pivoting hanger'extends atop said telescoping tube to provide a means by which to hold the retractable shade; wherein the telescoping tube can be adjusted to different lengths thereby offering varying levels of shade; wherein the retractable shade is spring-loaded and can fold vertically when not in use.

The Comeau Patent (U.S. Pat. No. 4,619,302) discloses a semi-adjustable shade and roller combination in which an essentially non-stretchable shade material is mounted on a telescoping roller. However, the semi-adjustable shade and roller are not portably mounted for use in an outdoor patio in order to provide shade to an area thereon.

The Judkins Patent (U.S. Pat. No. 6,712,115) discloses a headrail for holding a roller shade, wherein the roller shade can be exposed for easy removal and replacement. However, the roller shade is not a portably mounted sun shade that includes a retractable sun shade for use on a deck or patio.

The Kim Patent (U.S. Pat. No. 5,685,354) discloses an automatically retractable sun shade assembly. Again, the sun shade is not a portably actuated device that can be secured to a rail of a patio or deck and of which includes a retractable sun shade of provide shade to the adjacent portion of said patio or deck.

The Tomita Patent (U.S. Pat. No. 6,457,508) discloses a lightweight sunshade roll screen. However, the sunshade does not teach a clamping means to attach a device on a rail of a deck or patio and from which a retractable shade shall extend.

The Kirberg Patent (U.S. Pat. No. 3,629,910) discloses a rollup-type screen for receiving projected pictures and constructed to operate either on a floor stand or hung from a wall or ceiling. However, the rollup-type screen is not particularly adaptable for use in a portable capacity in which the screen is attached to a rail from which the shade is provided there from.

The Lin Patent (U.S. Pat. No. 6,189,948) discloses a motorized sun-shade assembly having a horizontal roller rotatably mounted in the housing. Again, the sun-shade is not a portably engageable device for use with a hand rail of a deck or patio.

While the above-described devices fulfill their respective and particular objects and requirements, they do not describe a portable sun shade that attaches to a hand rail of a patio or deck and of which a retractable sun shade extends upon a telescoping tube to provide shade to an area of the patio or deck immediately adjacent; wherein a pivoting hanger extends atop said telescoping tube to provide a means by which to hold the retractable shade; wherein the telescoping tube can be adjusted to different lengths thereby offering varying levels of shade; wherein the retractable shade is spring-loaded and can fold vertically when not in use. In this regard, the portably engaged retractable sun shade departs from the conventional concepts and designs of the prior art.

SUMMARY OF THE INVENTION

The portably engaged retractable sun shade includes a clamping means that enables the device to attach to a hand rail of a patio or deck to provide a portable sun shade. A telescoping tube extends from the clamping means to provide a means of supporting a retractable shade. The retractable shade is spring loaded and returns to a retracted state unless held in an extended state via a pivoting hanger engaged atop said telescoping tube. The retractable shade can rotate vertically with respect to the telescoping tube for storage when no longer in use.

An object of the invention is to provide a portable sun shade that mounts on a hand rail or other surface associated with an outdoor patio or deck.

A further object of the invention is to provide a retractable sun shade that is spring-loaded and retracts when not extended.

A further object of the invention is to provide a clamping means that enables the device to be portably installed upon any surface associated with the patio or deck.

A further object of the invention is to provide a telescoping tube that extends vertically with respect to the clamping means and of which when extended shall support the retractable shade in an extended state.

An even further object of the invention is to provide a telescoping tube that can extend to varying heights to provide an adjustable shade.

A further object of the invention is to provide a retractable shade that can rotate to a vertical orientation with respect to the telescoping tube for storage purposes and no longer in use.

A further object of the invention is to provide a retractable shade that can rotate about a pivot point defining a horizontal axis formed between the telescoping tube and the clamping means.

These together with additional objects, features and advantages of the portably engaged retractable sun shade will be readily apparent to those of ordinary skill in the art upon reading the following detailed description of presently preferred, but nonetheless illustrative, embodiments of the portably engaged retractable sun shade when taken in conjunction with the accompanying drawings.

In this respect, before explaining the current embodiments of the portably engaged retractable sun shade in detail, it is to be understood that the portably engaged retractable sun shade is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portably engaged retractable sun shade.

It is therefore important that the claims be regarded as including such equivalent construction insofar as they do not depart from the spirit and scope of the portably engaged retractable sun shade. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 6 illustrates a perspective view in which the retractable sun shade is removed from the housing.

DETAILED DESCRIPTION OF THE EMBODIMENT

Figure 1:
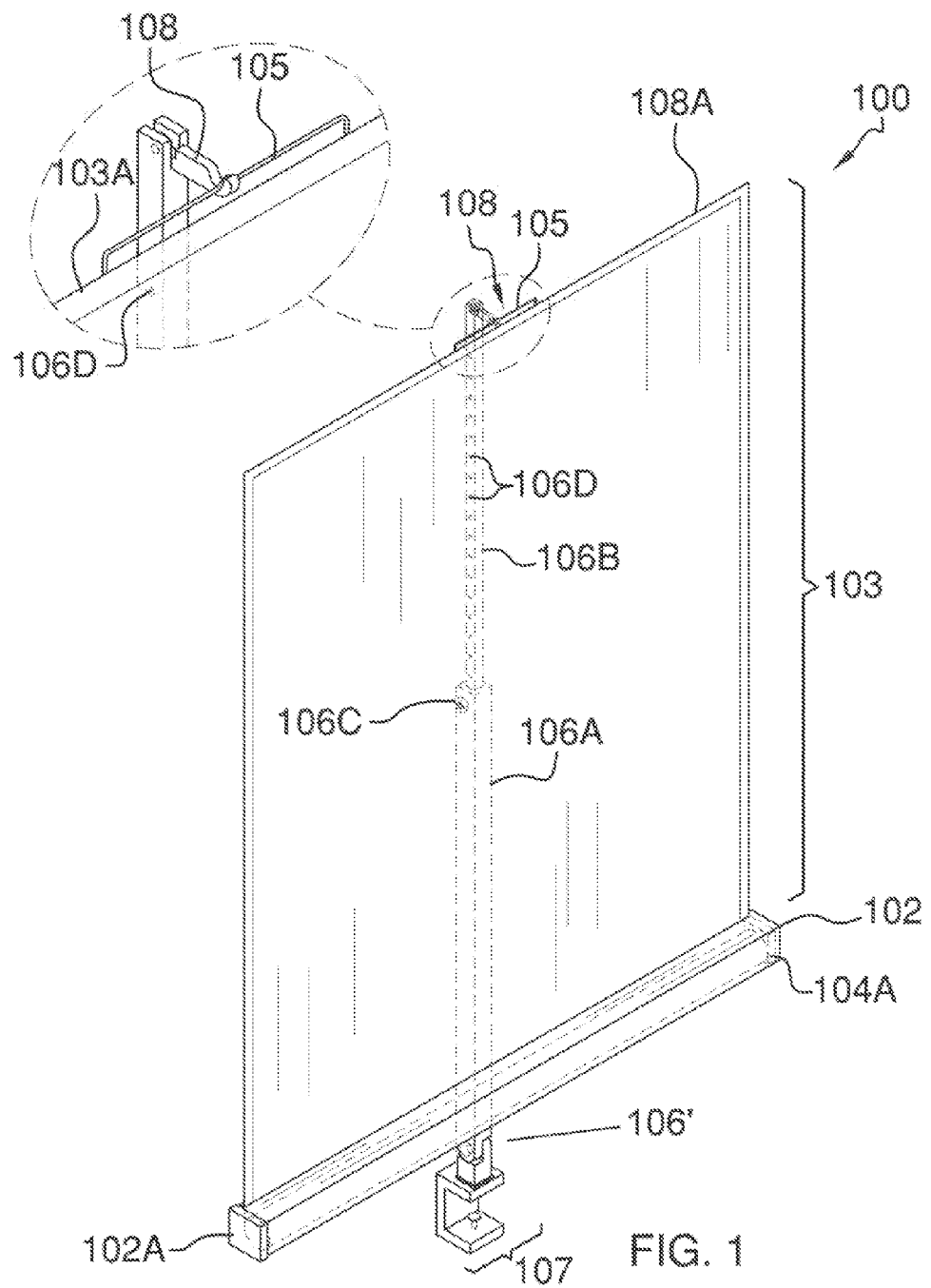
FIG. 1 illustrates an isometric view of the portably engaged retractable sun shade in which the retractable shade is fully extended and the telescoping tube is depicted in dashed lines with a detail showing the pivoting hanger holding the handle/hook of the retractable shade.
Figure 2:
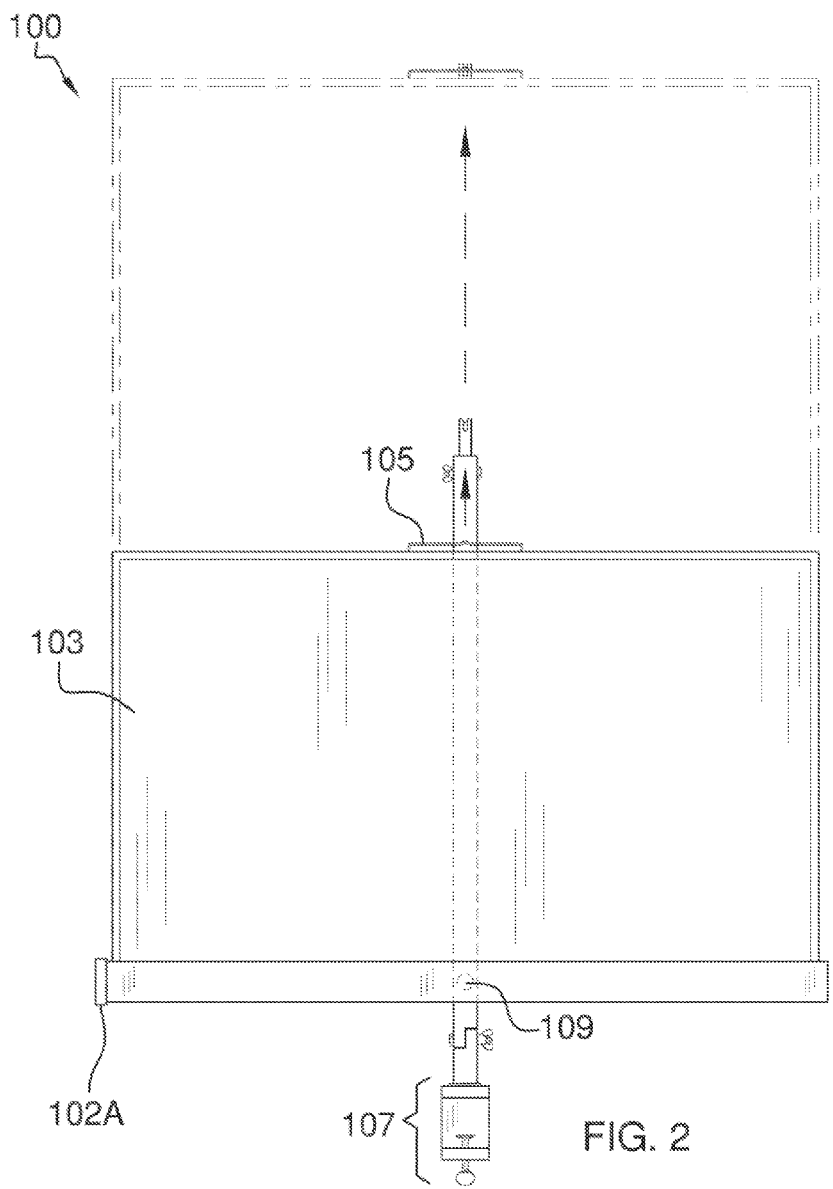
FIG. 2 illustrates a front view of the portably engaged retractable sun shade with arrows indicating raising of the retractable shade.
Figure 3:
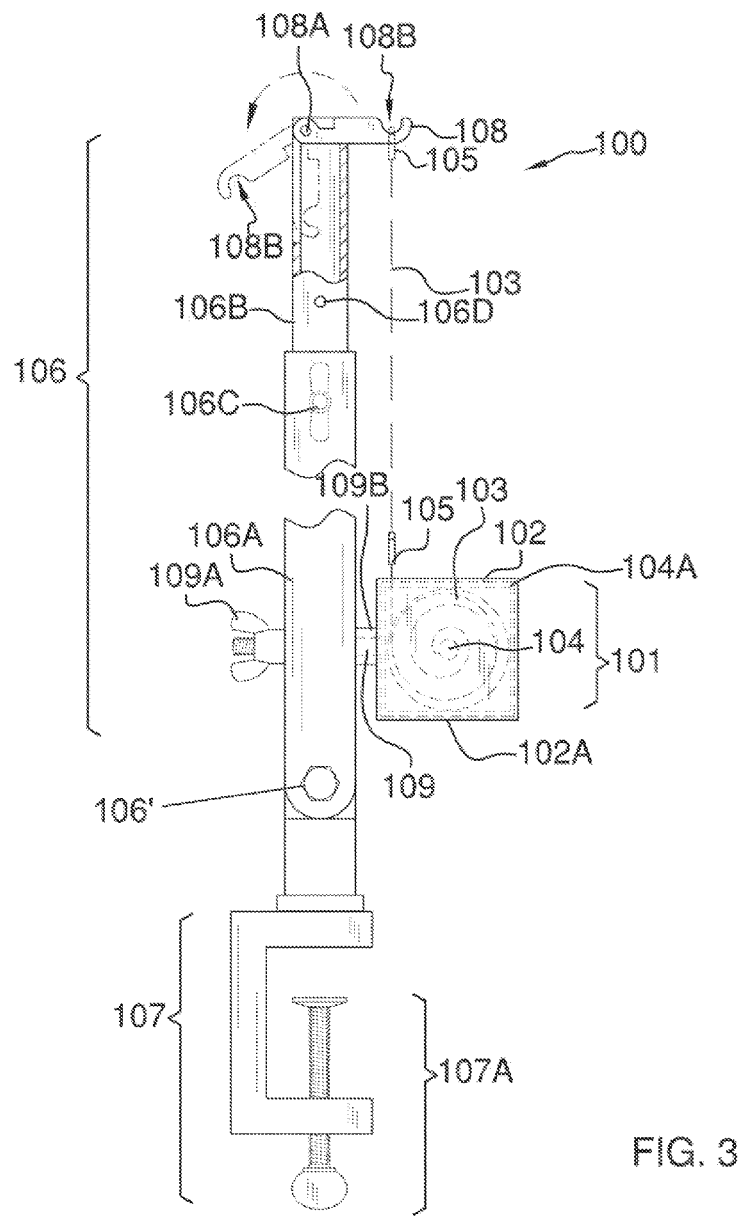
FIG. 3 illustrates a side detail view of the telescoping tube and cut-away of the pivoting hanger as well as a detail of the retractable shade and clamp.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A portably engaged retractable sun shade 100 (hereinafter invention) includes a retractable shade 101 further comprised of a housing 102 into which a shade 103 extends. The shade 103 includes a spring 104, which coils the shade 104 when not extended (see FIG. 3). A shade handle 105 is located along a top edge 103A of the shade 103, and provides a means to extend the shade 103 from the housing 102. Also, the shade handle 105 provides a means to hold the shade 103 in the extended state (see FIG. 1).

The shade 103 shall be made of a material that is not translucent, and provides shade from light whether artificial or naturally produced. The shade 103 shall be made of a flexible material that enables the shade to roll up when not in use via the spring 104.

A telescoping tube 106 attaches to a clamping means 107 via a pivot point 106'. The pivot point 106' is adjustable such that the telescoping tube 106 can adjust an angle 106" formed with respect to the clamping means 107. The construction of the pivot point 106' includes a bolt and wing nut combination.

The telescoping tube 106 is further comprised of a bottom tube 106A into which a top tube 106B extends in a telescoping fashion, which is further defined by the bottom tube 106A having an opening into which the top tube 106B can enter and be slideably engaged. A bolt 106C secures the top tube 106B at a height selected with the bottom tube 106A upon selection and alignment of one of a plurality of holes 106D.

A pivoting hanger 108 is located on a top end of the top tube 106B of the telescoping tube 106. The pivoting hanger 108 attaches to the top tube 106B via a pin 108A. The pivoting hanger 108 can rotate about the top tube 106B (see FIG. 3) in order to either rest in a fully retracted state or at an extended state. The pivoting hanger 108 includes a notch 108B is responsible for hanging the shade handle 105 thereon. The pivoting hanger 108 supports the shade 103 in an extended state in order to provide shade to an area adjacent the invention 100.

The clamping means 107 is composed of a C-clamp, which is well known in the art, and is useful for providing a means of clamping the invention 100 to a surface such as a hand rail 130 of a patio 131. The clamping means 107 includes a thumbscrew 107A that when turned rotates in or out to provide a clamping action onto the hand rail 130.

Figure 4:
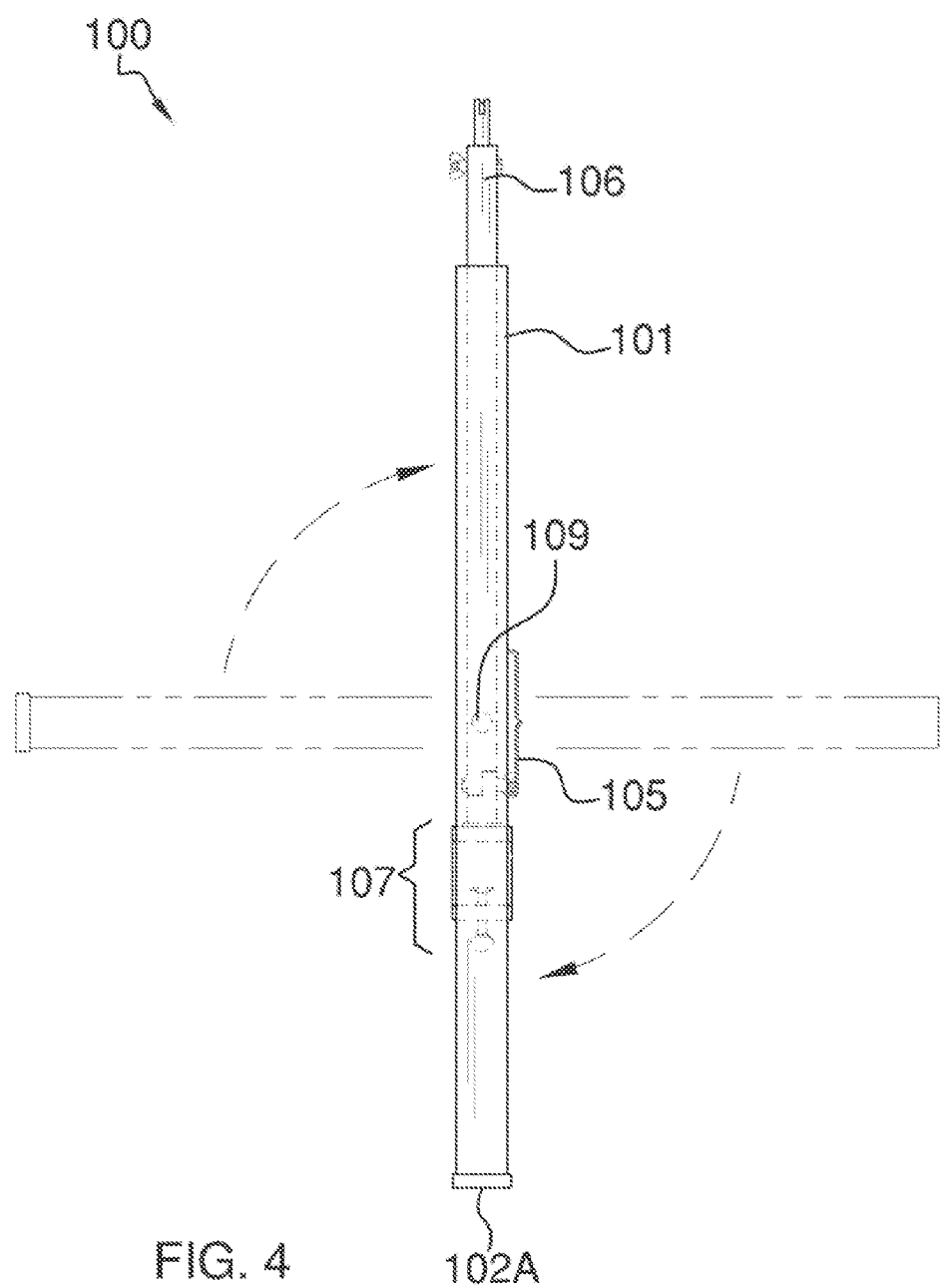
FIG. 4 illustrates a view depicting the retractable shade in a stored orientation, and wherein arrows indicate rotation of the retractable shade.
Figure 5:
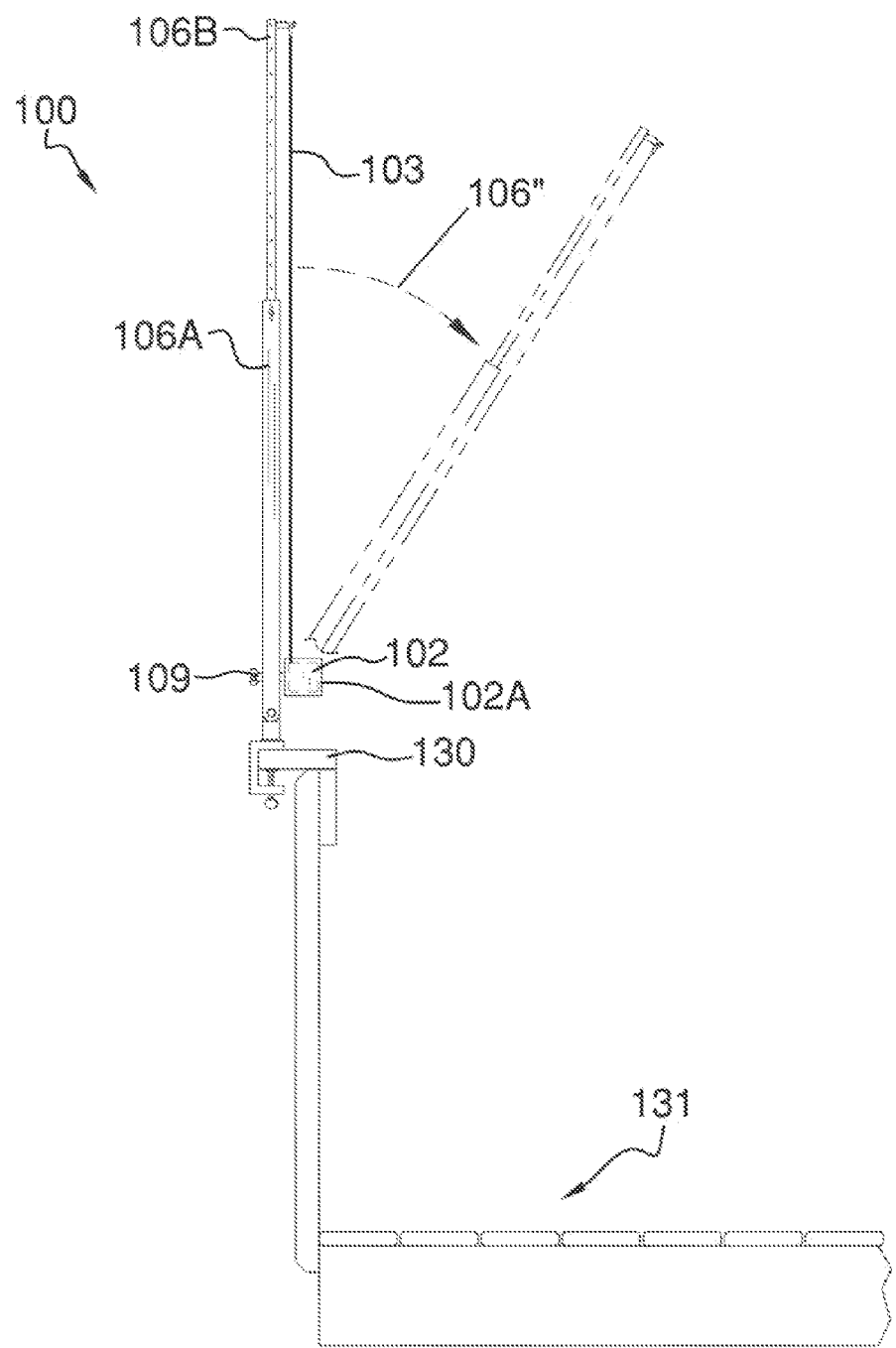
FIG. 5 illustrates a side view of the portably engaged retractable sun shade clamped onto a deck rail and with the retractable shade fully extended to provide shade to the area of the deck in the vicinity, and a rotational arrow depicts rotation of the sun shade about a pivot point formed between the telescoping tube and the clamping means.

The housing 102 of the retractable shade 101 attaches to the telescoping tube 106 via a bolt 109. The bolt 109 extends from the housing 102 and through the bottom tube 106A of the telescoping tube 106 before a wing nut 109A secures the housing 102 to the bottom tube 106A. It shall be noted that a collar 109B may be used to provide a means of separating the housing 102 from the bottom tube 106A with a distance dictated by the length of the collar 109B. Referring to FIG. 4, the bolt 109 can be loosened, and enables the retractable shade 101 to rotate with respect to the telescoping tube 106. The ability to rotate the retractable shade 101 with respect to the telescoping tube 106 enables the invention 100 to fold flat when not in use for storage purposes, and thereafter rotate the retractable shade 101 in order to use the invention 100. It shall be further noted that when folding the invention 100 flat requires retracting the telescoping tube 106 as well.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

While the embodiments of the invention have been disclosed, certain modifications may be made by those skilled in the art to modify the invention without departing from the spirit of the invention.

The inventor claims:

1. A portably engaged retractable sun shade comprising:
a retractable shade that is supported in an extended state via a telescoping tube that includes a clamping means for securement of the portably engaged retractable sun shade on a hand rail;
wherein the shade is further defined by a housing into which the shade extends and retracts; a spring coils the shade into a retracted position when not extended via the telescoping tube; wherein a shade handle extends along a top edge of the shade and provides a means to hold extended or extend the shade;
wherein the housing of the retractable shade attaches to the telescoping tube via a bolt; the bolt extends from the housing and through the bottom tube of the telescoping tube before a wing nut secures the housing to the bottom tube; the bolt can be loosened, and enables the retractable shade to rotate with respect to the telescoping tube;
wherein the clamping means is composed of a C-clamp including a thumbscrew that when turned rotates in or out to provide a clamping action onto the hand rail;
wherein the telescoping tube is further comprised of a bottom tube into which a top tube extends in a telescoping fashion; a bolt secures the top tube at a height selected with the bottom tube upon selection an alignment of one of a plurality of holes located on the top tube;
wherein a pivoting hanger is located on a top end of the top tube of the telescoping tube; wherein the pivoting hanger attaches to the top tube via pin; wherein the pivoting hanger can rotate about the top tube in order to either rest in a fully retracted state or at an extended state; wherein the pivoting hanger includes a notch responsible for hanging the shade handle thereon;
wherein a collar separates the housing from the bottom tube.

2. The portably engaged retractable sun shade as described in claim 1 wherein a pivot point is located between the telescoping tube and the clamping means such that an angle formed therein may be adjustable.

3. A portably engaged retractable sun shade comprising:
a retractable shade that is supported in an extended state via a telescoping tube that includes a clamping means for securement of the portably engaged retractable sun shade on a hand rail;
wherein the shade is further defined by a housing into which the shade extends and retracts; a spring coils the shade into a retracted position when not extended via the telescoping tube; wherein a shade handle extends along a top edge of the shade and provides a means to hold extended or extend the shade;
wherein the housing of the retractable shade attaches to the telescoping tube via a bolt; the bolt extends from the housing and through the bottom tube of the telescoping tube before a wing nut secures the housing to the bottom tube; the bolt can be loosened, and enables the retractable shade to rotate with respect to the telescoping tube;
wherein the clamping means is composed of a C-clamp including a thumbscrew that when turned rotates in or out to provide a clamping action onto the hand rail;
wherein the telescoping tube is further comprised of a bottom tube into which a top tube extends in a telescoping fashion; a bolt secures the top tube at a height selected with the bottom tube upon selection and alignment of one of a plurality of holes located on the top tube;
wherein a pivoting hanger is located on a top end of the top tube of the telescoping tube; wherein the pivoting hanger attaches to the top tube via a pin; wherein the pivoting hanger can rotate about the top tube in order to either rest in a fully retracted state or at an extended state; wherein the pivoting hanger includes a notch responsible for hanging the shade handle thereon;
wherein a collar separates the housing from the bottom tube;
wherein a pivot point is located between the telescoping tube and the clamping means such that an angle formed therein may be adjustable.

\* \* \* \* \*